May 13, 1947.  A. H. STITH  2,420,505
DENTIST'S MEASURING SPOON
Filed July 20, 1944

Inventor
Andrew H. Stith
By McCaleb, Wendt & Dickinson
Attorneys

Patented May 13, 1947

2,420,505

UNITED STATES PATENT OFFICE 2,420,505

DENTIST'S MEASURING SPOON

Andrew H. Stith, Chicago, Ill.

Application July 20, 1944, Serial No. 545,832

2 Claims. (Cl. 222—130)

My present invention relates to a simple time-saving device which I choose to call a dentist's measuring spoon because it enables dentists, or their assistants, properly to proportion with speed and precision the so-called acrylic powders utilized in the making of variously shaded plastic teeth, tooth facings, and other dental restorations. However, my new spoon may be adapted to the proper proportioning of finely divided solids other than the powdered resins of prosthetic dentistry.

A salient object of my invention is to provide a simple, sturdy, low-priced tool that is useful to dentists and their laboratory assistants in proportioning with ease and exactness the differently tinted powders employed in the making of rightly shaded plastic dentures.

Another object of my invention is to provide a novel measuring spoon comprising in its bowl portion a plurality of partitioned compartments that can be simultaneously filled and individually emptied.

Another object of the invention is to provide a measuring spoon that may be manipulated entirely or for the most part with one hand of the operator.

The important features of the hereinafter described preferred form of my improved measuring spoon are: that the partitioned bowl is circular and has a spherically convex bottom; that at least all of the bowl compartments save one are provided with outlet apertures extending through the bowl bottom; that such outlet apertures can be simultaneously closed by a circular valve plate having a spherically concave upper surface snugly fitting the spherically convex bottom of the bowl; that such valve plate may be rotated successively to open such outlet apertures; and that an annular cylindrical surface of the valve plate is disposed concentrically with and immediately adjacent to an annular cylindrical surface of like radius presented by the bowl.

These and other features, objects and advantages of my improved measuring spoon will appear in the following detailed description wherein reference is made to the accompanying sheet of drawings, in which.

Similar characters of reference refer to similar parts throughout the several views.

Figure 1:
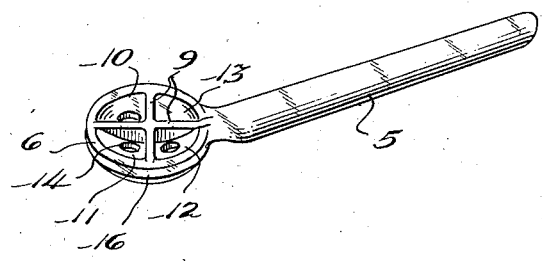
Fig. 1 is a perspective view of the measuring spoon.
Figure 2:
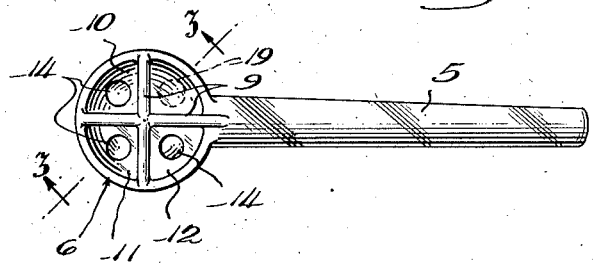
Fig. 2 is a top plan view thereof.
Figure 3:
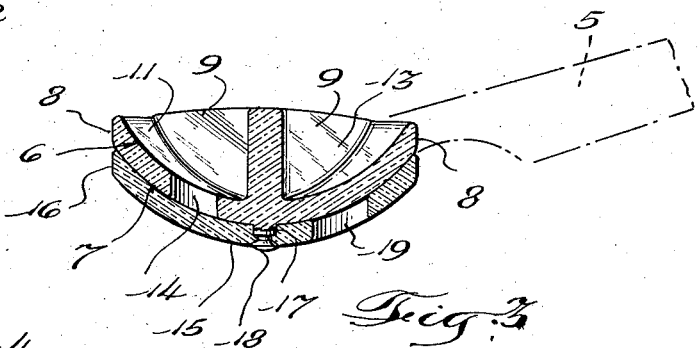
Fig. 3 is a sectional view that may be regarded as taken on the line 3—3 of Fig. 2 and looking in the direction indicated by the arrows.
Figure 4:
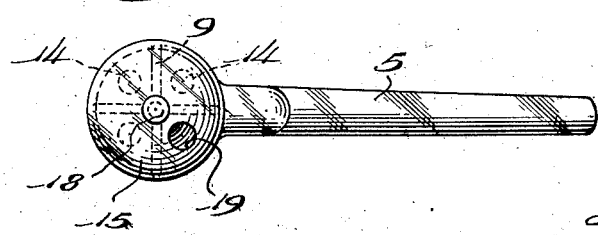
Fig. 4 is a bottom plan view of the spoon.

Many different materials may be used in the construction of my measuring spoon. However, I have chosen to illustrate the same as having its component parts formed of a molded plastic material, e. g., methyl methacrylate resin.

The measuring spoon comprises a handle 5 formed integral with the bowl 6 which is circular as viewed from the top and is provided with a spherically convex under-surface 7. The bowl also is provided with an annular cylindrical surface 8 concentric with the axis of the presently-to-be-mentioned valve plate.

Partitions 9 formed integral with the bowl 6 divide it into four compartments 10, 11, 12 and 13 which are of equal size. Each of the compartments 10, 11 and 12 is provided with an outlet opening 14 extending through the bowl bottom, whereas compartment 13 preferably has no such outlet opening.

At 15 is depicted a spherically concavo-convex valve plate having its concave upper surface snugly fitting the convex undersurface of bowl 6. Such valve plate 15 is provided with an annular cylindrical surface 16 which is disposed immediately adjacent to and is coaxial with and has the same radius as the annular cylindrical surface 8 of the bowl 6. Plate 15 is rotatable upon the bowl bottom by virtue of a pivot stud 17 which, being formed integral with bowl 6, extends through a bearing aperture in the plate 15 and is upset, as at 18, to hold plate 15 snugly against the under-surface of the bowl 6. Valve plate 15 is provided with a single opening 19 adapted to be turned into registry with any one of the aforementioned bowl compartment outlet apertures 14.

Now let us assume that my measuring spoon is being employed to measure out two units of a given acrylic powder—a unit being the levelful content of one of the spoon-bowl compartments. With the valve plate 15 closing all the outlet apertures 14, the spoon is so manipulated that its bowl becomes levelful with the appropriate acrylic powder. Then the plate 15 is turned to place its opening 19 successively in registry wtih two of the compartment outlet apertures 14—thus discharging all but two units of the powder from the spoon bowl which now may be emptied in the usual way by turning it upside down in or over a receptacle provided to receive the measured powder or powders. If but one unit of a given powder is required, the contents of three compartments may be withdrawn from the spoon bowl, and if three units of the powder are required, the contents of but one compartment may be withdrawn from the spoon bowl, before the spoon is emptied into the receiver of the measured powders.

Another satisfactory way to use the measuring spoon is merely to employ the valve plate to pass from the bowl, directly into the measured powder receiver, the unit or units required.

The contiguity, alignment and concentricity of the annular cylindrical surfaces 8 and 16 facilitate operation of the valve plate 15 by the same hand that grasps the handle 5. For example, with the handle 5 gripped between the thumb and the index finger of one hand, the valve plate 15 may be easily and satisfactorily rotated merely by pressing the tip of the second finger against the surfaces 8 and 16 and sliding it on surface 8.

Having thus illustrated and described my improved measuring spoon, what I claim as new and desire to secure by Letters Patent of the United States is:

1. A spoon for measuring acrylic powders or other finely divided solids comprising a bowl having a spherically convex bottom, partitions dividing the bowl into a plurality of like compartments, some of said compartments having outlet apertures extending through the bowl bottom, a spherically concavo-convex valve plate snugly rotatably fitting the bowl bottom and adapted simultaneously to close all of said outlet apertures, and an opening in the valve plate adapted successively to be brought into registry with the several outlet apertures when the plate is rotated relative to the bowl, the bowl and the valve plate presenting for fingertip engagement immediately adjacent annular cylindrical surfaces which are concentric with the valve plate axis and have the same radius.

2. A spoon for measuring and dispensing measured quantities of finely divided solids such as powder and comprising, in combination, a bowl having a spherically shaped convex bottom and a laterally projecting handle integrally molded with the bowl at one side of the top of the bowl, integrally molded radial partitions dividing the bowl into a plurality of compartments, an integral pivot stud projecting axially from the center of the bottom of the bowl, some of said compartments having outlet apertures extending through the bowl bottom, a spherically shaped concavo-convex valve plate snugly fitting the bowl bottom and having a central aperture fitting said pivot stud for rotatably supporting the valve plate relative to the bowl bottom, said valve plate being adapted simultaneously to cover and close all of said outlet apertures and having an opening therethrough adapted successively to be brought into registry with each of the outlet apertures when the valve plate is rotated, said bowl and valve plate being of substantially the same outside diameter and presenting adjacent cylindrical surfaces accessible for fingertip movement of the valve plate when the spoon is carried by said handle.

ANDREW H. STITH.

REFERENCES CITED

The following references are of record in the file of this patent:

UNITED STATES PATENTS

| Number | Name | Date |
|---|---|---|
| 1,208,189 | Miller | Dec. 12, 1916 |
| 2,259,504 | Wilson et al. | Oct. 21, 1941 |
| 923,229 | Williams | June 1, 1909 |
| 1,368,448 | Minch | Feb. 15, 1921 |

FOREIGN PATENTS

| Number | Country | Date |
|---|---|---|
| 3,247 | Great Britain | June 6, 1912 |